United States Patent
Hoppe et al.

(10) Patent No.: US 7,041,951 B2
(45) Date of Patent: May 9, 2006

(54) METHOD AND APPARATUS FOR INVESTIGATING LAYERS OF TISSUES IN LIVING ANIMALS USING A MICROSCOPE

(75) Inventors: Martin Hoppe, Waibstadt (DE);
Werner Knebel, Kronau (DE); Kyra Moellmann, Trippstadt (DE); Rafael Storz, Heidelberg (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 120 days.

(21) Appl. No.: 10/700,929

(22) Filed: Nov. 4, 2003

(65) Prior Publication Data
US 2004/0092828 A1 May 13, 2004

(30) Foreign Application Priority Data
Nov. 5, 2002 (DE) ................ 102 51 345

(51) Int. Cl.
*G02B 27/64* (2006.01)
*A61B 6/00* (2006.01)

(52) U.S. Cl. ............... 250/201.3; 250/221; 600/476; 356/624

(58) Field of Classification Search ........... 250/201.3, 250/221; 600/473, 476; 356/609, 624
See application file for complete search history.

(56) References Cited

U.S. PATENT DOCUMENTS 5,604,344 A 2/1997 Finarov .............. 250/201.3

2001/0056237 A1* 12/2001 Cane et al. ............... 600/475

FOREIGN PATENT DOCUMENTS

DE 195 37 376 A1 4/1996

OTHER PUBLICATIONS

Illig, Leonhard, "Circulatory microscopy on the mesenterlum and pancreas in living rabbits," Zeitschrift fur die gesamte experimentelle Medizin, vol. 126, pp. 249-277 (1955). Note—English translation of pp. 249-253; section A, p. 253 to middle of p. 256; section 7b, p. 260; item 3, p. 274 to end of p. 276 only.

* cited by examiner

*Primary Examiner*—Kevin Pyo
(74) *Attorney, Agent, or Firm*—Houston Eliseeva LLP

(57) ABSTRACT

The invention concerns a method and an apparatus for investigating layers (1) of tissues in living animals using a microscope (2). The microscope (2) is focused onto a layer (1), and images of the layer (1) are acquired or optical measurements are performed on it. Positional changes of the layer (1) are brought about by movements of the animal or of its organs. The positional changes are sensed, and corresponding signals are generated. The signals are stored, together with the corresponding images or measurement results, for later evaluation; or they are processed in such a way that the positional changes are compensated for in order to investigate the layer (1). As a result, the layer (1) can be qualitatively or quantitatively investigated microscopically, irrespective of the movement of the animal or its organs.

10 Claims, 1 Drawing Sheet

METHOD AND APPARATUS FOR INVESTIGATING LAYERS OF TISSUES IN LIVING ANIMALS USING A MICROSCOPE

RELATED APPLICATIONS

This application claims priority of the German patent application 102 51 345.7 which is incorporated by reference herein.

FIELD OF THE INVENTION

The invention is based on a method and an apparatus for investigating layers of tissues in living animals using a microscope, the microscope being focused onto a layer being investigated.

BACKGROUND OF THE INVENTION

Microscopic investigations on living animals are performed at various locations on the animal for purposes of basic research. In particular, the interaction of neurons following an applied external stimulus is investigated in various tissue layers in the brains of laboratory animals, e.g. mice. The speed with which the stimulus is transmitted, and the interconnections among the neurons, can supply valuable information that may lead to a better understanding of various brain diseases (Parkinson's, Alzheimer's, multiple sclerosis). It is also usual to perform surgical operations in which tissue is exposed and is continuously monitored microscopically, for example so that a change in blood flow can be observed (by measuring the flow rate) in peripheral tissues after the application of various medications.

In these investigations, the animal is tranquilized and the body part on which the tissue investigation is taking place is immobilized in a position suitable for microscopy. For investigations of the brain, the animal's head is appropriately immobilized under the microscope. Despite this immobilization, positional changes of the tissue with respect to the microscope can be brought about. The positional changes can be brought about on the one hand by a movement caused by or imparted to the animal. On the other hand, positional changes of the tissue being investigated can also result from movements of the animal's organs, in particular due to respiration and the animal's heartbeat and pulse. The changes in tissue position caused thereby generally do not represent a uniform movement. They can, however, be greater than the microscope's depth of field in the direction of the optical axis of the microscope; this is often the case at higher microscope magnifications or in the context of a confocal microscope. As a result, in a series of individual images of a tissue layer acquired by means of a camera on the microscope, some of the images are not sharp. These images are thus created during a time period in which the tissue, because of its movement, is not located at the microscope's focus. These unsharp images must then be identified within the overall image data set by visual inspection by a professional user, and discarded or deleted. This process is cumbersome and time-consuming. If a non-electronic camera is used, a large amount of unusable film material is moreover generated, which is unfavorable in terms of cost.

The sharp and unsharp microscope images created in time with the animal's movements are, of course, also disruptive when continuously viewing the tissue layer through the microscope. The same is also true for images acquired using an electronic camera with simultaneous visualization of the images on a monitor or display. With continuous observation, the alternately sharp and unsharp images quickly cause visual fatigue in the viewer.

SUMMARY OF THE INVENTION

It is the object of the invention to describe a method and an apparatus with which at least one tissue layer in living animals can be investigated microscopically irrespective of movements of the animal or its organs.

The object is achieved in a method of the kind described above by way of the following steps:
focusing the microscope onto the tissue layer being investigated,
generating signals that correspond to the positional changes of the tissue layer brought about by movements of the animal or by movements of the animal's organs, or that at least indicate the beginning of a positional change;
acquiring images or/and performing optical measurements even during the positional changes, and
storing the signals, together with the corresponding images or/and the results of the measurements, for later evaluation, in which the images or measurements made when the layer being investigated is in focus are identified on the basis of the signals, or
processing the signals in such a way that the positional changes are compensated for in real time and the tissue layer being investigated is thereby always in focus.

As an alternative, the object is achieved in a method of the kind described above by way of the following steps:
focusing the microscope onto the tissue layer being investigated,
stimulating the animal in order to cause defined organ movements and thus defined positional changes of the tissue layer;
acquiring images or/and performing optical measurements even during the positional changes, and
storing the images or measurement results acquired during or after the stimulation for later evaluation, or
compensating for the positional changes of the tissue layer as a function of the stimulation.

The object is also achieved by an apparatus comprising:
a microscope,
a focusing device for focusing the microscope onto a tissue layer;
a movement measuring means for direct or indirect sensing of positional changes or at least of the beginning of positional changes of the tissue layer that are brought about by movements of the animal or of the animal's organs, the movement measuring means generating corresponding signals;
a camera for acquiring images and a measuring device for performing optical measurement even during the positional changes, and
a memory for storing the signals, together with the associated images of the camera or together with the measurement results of the measuring device, for later evaluation.

As an alternative, the object is achieved in an apparatus comprising:

a microscope, a focusing device for focusing the microscope onto a tissue layer;

a stimulation means for causing defined organ movements and therefore defined positional changes of the tissue layer;

a camera for acquiring images and a measuring device for performing optical measurement even during the positional changes, and a memory for storing the images acquired during or after the stimulation, or for storing measurement results of the measurement device, for later evaluation.

Microscopic investigation of tissue layers in a living animal is considerably facilitated by the methods and apparatuses according to the present invention, since it can be performed irrespective of movements of the animal or its organs. Either the movement of the tissue layer being investigated, caused in particular by the animal's heartbeat, is compensated for so that the tissue layer is always located at the focus of the microscope and the tissue can thus always be sharply imaged; or a series of images is acquired, the images of both the sharply and unsharply imaged tissue being recorded together with the signals that correspond to the positional changes of the layer. Upon subsequent evaluation, the unsharp images that fall within the time of the heartbeat, and thus of the movement of the tissue layer, are automatically identified and discarded. These unusable images therefore no longer need to be individually selected by an observer. This thus saves time and expense.

The investigations of the tissue layer refer on the one hand to graphic depiction of the tissue, or of individual cells or cell organelles in the tissue, using the microscope. The shape, structure, or color of the tissue or the cells is observed and investigated for changes. Dynamic changes in particular are also investigated.

On the other hand, quantitative measurements are also performed, for example in order to ascertain the quantity and distribution of certain substances in the cells. These substances can be either chemical substances introduced from outside, or biological molecules or ions present in the organism (for example, local changes in Ca ion concentration are investigated). Using known methods of selective excitation of molecules in the infrared, visible, or ultraviolet wavelength region of light, and by appropriate spectroscopy of the molecules, their quantity and distribution can be determined quantitatively. One specific method in this context is fluorescence analysis or fluorescence spectroscopy, in which a fluorescent dye that has previously been bound to the molecule (and has thereby labeled it) is specifically excited with light, and the frequency-shifted emitted fluorescent light is measured. The distribution of the labeled molecules in the tissue layer, and thus also their specific binding sites in the tissue, are thereby quantitatively determined. By means of the invention, these investigations can be performed irrespective of positional changes of the tissue layer.

The investigations can be performed with all types of microscopes, both with a conventional light microscope and with a fluorescence or polarizing microscope or a confocal microscope. At high microscope magnifications and in particular with confocal scanning microscopes, in which a specimen is scanned in point fashion in three dimensions, a high axial and lateral resolution is obtained. The high axial resolution means a very shallow depth of field, so that only a very thin layer within the tissue is imaged sharply. A three-dimensional image of the entire tissue layer can be assembled by also imaging tissue layers located lower down. Because of the shallow depth of field, even slight positional changes of the tissue layer cause the focused layer to depart from the focus region of the microscope.

According to the present invention, the positional changes of the tissue layer are sensed, or the animal is stimulated, in such a way that defined positional changes of the tissue layer occur. The positional changes of the layer can be sensed directly or indirectly, i.e. either the positional changes of the layer being observed are directly recorded or measured, or the movements of other parts of the animal outside the layer being observed are recorded or measured, in order to determine indirectly therefrom the positional changes of the layer being observed. There are a number of possible embodiments for this purpose, which will be mentioned below by way of example.

The positional changes of the tissue layer can be sensed either by optical scanning of the layer itself or by optical scanning of other parts of the animal that trigger the movement of the tissue layer. These other parts of the animal are, for example, the thorax, which moves with the animal's respiration or heartbeat; or an externally visible artery, which moves with the rhythm of the heartbeat and pulse. Optical scanning of these moving parts of the animal can be accomplished by scanning the contours of these locations using a laser beam. This yields a profile that changes with the rhythm of the movements. The signals obtained therefrom can be stored, together with the associated images of the tissue layer or the results of the optical investigations of the tissue layer, for later evaluation; or are used for immediate compensation for the positional changes of the tissue layer, e.g. by refocusing with the microscope.

Analogously, the optical scanning can also be accomplished by acquiring images of the tissue layer or of the moving locations on the animal. The movements can be sensed by image processing, e.g. using contrast functions, and the signals obtained therefrom can, as already mentioned, be stored or used directly for immediate compensation for the positional changes of the tissue.

Another possible embodiment for sensing the positional changes of the tissue consists in ascertaining the animal's heartbeat using electrodes that are attached to the animal and supply electrical signals, similarly to the case with an EKG (electrocardiogram) or EEG (electroencephalogram). These electrical signals are an indicator of the positional changes of the tissue and can be evaluated correspondingly.

A further possible embodiment consists in measuring the animal's pulse, by analogy with pulse measuring instruments for humans. A pressure sensor measures the animal's pulse and converts the pressure changes of the pulse into corresponding electrical signals. The latter are converted, with an analog-digital converter, into digital signals that are evaluated for the positional changes of the tissue. In the context of investigations of brain tissue, the pulse can also be measured directly in the brain itself.

It is furthermore possible to measure the positional changes of the tissue layer in advance, using one of the aforementioned methods, in order to achieve a calibration. Although the positional changes do not correspond to a regular movement of the layer, they are reproducible within certain limits. The differing blood pressure during the various phases of cardiac contraction causes a volume change in the region of the peripheral blood vessels. This volume change is expressed as a kind of movement of the surrounding tissue. Since this movement is to a large extent repetitive, the optical system can be specifically servocontrolled. By appropriate calibration, the microscope or its focusing device is appropriately programmed so that the tissue layer is always located at the focus of the microscope. Image data acquisition is accomplished synchronously with both the axial and lateral movement of the tissue layer.

The beginning of the positional changes of the tissue layer can moreover also be stimulated. Stimulation can be accomplished in numerous ways, for example by means of an electrical pulse (via electrodes or using a cardiac pacemaker), a mechanical stimulus (e.g. by pulling on the animal's vibrissae), a temperature stimulus, or a light stimulus. A light stimulus can be accomplished in particular by way of a multi-photon excitation, e.g. using a confocal scanning microscope, and can penetrate deeply into the tissue without damaging the surface of the tissue. With such stimuli, it is possible to determine in advance the points in time that are optimal for acquiring images or making measurements on the tissue layer.

Stimulation of the animal can also be performed for its own sake, with no need to sense the positional changes of the tissue layer directly or indirectly. This assumes, of course, that the positional changes are defined and reproducible. By suitable stimulation of the animal at the heart or at certain nerve points, movements that are sufficiently reproducible for investigation of the tissue layer can be caused. A cardiac pacemaker can be used for this purpose, the cycle frequency and amplitude of its electrical signals being adjusted accordingly.

If applicable, the cycle frequency and, in particular, the amplitude of the signals of the cardiac pacemaker can be adjusted, and the animal's heart thus stimulated, in such a way that the positional changes of the layer being investigated that are brought about by the heartbeat and pulse movement in fact lie within the depth of field of the microscope. In this case all the acquired images of the tissue layer, and all the measurements, can be used. It is not necessary to discard unsharp images.

It is known that the beginning of a heartbeat precedes the positional change of the tissue layer. This corresponds to a phase difference or time difference between the beginning of the heartbeat and its effect on the position of the tissue layer and its spatial change. The time difference can be set using an electronic circuit (time delay), or by software. A time delay system of this kind can be used for the methods according to the present invention and for all the examples so far cited, so that image acquisition, the execution of measurements, or compensation for positional changes of the tissue layer begins only after the time delay that has been set. The result is to define time windows in which the tissue layer is advantageously in a focused state.

BRIEF DESCRIPTION OF THE DRAWINGS

The invention will be explained below in more detail with reference to the exemplary embodiment depicted in the drawings, in which FIG. 1 schematically shows an apparatus for investigating layers of tissue in living animals.

DETAILED DESCRIPTION OF THE INVENTION

Figure 1:
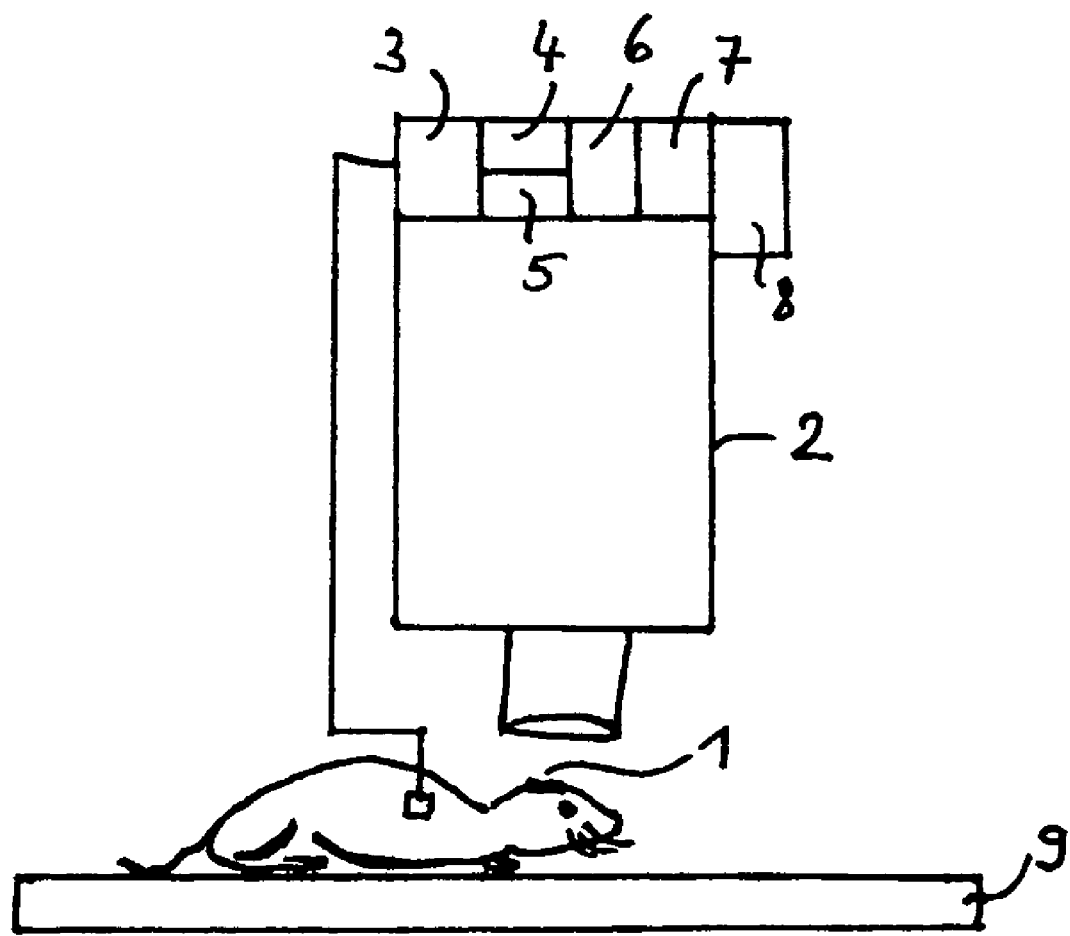

FIG. 1 schematically shows an arrangement having a living animal located on a microscope stage 9, and a microscope 2 with which investigations of layers 1 of tissue in the animal are performed. Microscope 2 is focused with a focusing device 7 on a tissue layer 1, so that the latter appears sharp or is imaged sharply when viewed through microscope 2 or imaged with a camera 6. Layer 1 in FIG. 1 is intended to represent a brain tissue layer of the animal. In this case the animal's head is immobilized in a clamping apparatus (not depicted in FIG. 1). The animal is often also tranquilized pharmaceutically. Despite the immobilization of the head or the pharmaceutical tranquilization, layer 1 moves, in particular because of the animal's heartbeat. As a result of this positional change, layer 1 can move out of the focal plane of microscope 2. The images of layer 1 that are viewed or acquired are sharp and unsharp in the rhythm of the heartbeat. The same also applies if, in addition to or instead of the images, optical measurements are performed using a measuring device 8, e.g. photometric measurements on layer 1 using a spectrophotometer. Measuring device 8 can, of course, also be a polarimeter, a fluorescence device, or another measurement apparatus that can be coupled to microscope 2.

According to the present invention, a movement measuring means 3 senses the positional changes of layer 1 or at least the beginning of its positional changes, movement measuring means 3 generating corresponding signals. In the exemplary embodiment shown in FIG. 1, movement measuring means 3 comprises a sensor, attached to the animal, that records the animal's heartbeats and is connected to a corresponding electronic system for generating signals. The sensor can perform a mechanical measurement, e.g. a pressure or movement measurement. A pressure or movement sensor is preferably attached to or in the vicinity of one of the animal's arteries. As a result, it can sense the animal's heartbeat or pulse on the basis of changes in pressure or movement. On the other hand, the sensor can also comprise at least one electrode that is attached to the animal and senses electrical signals from the animal's heart.

The signals of movement measuring means 3 travel into a memory 4 together with either the associated images of camera 6 or/and the measurement results of measuring device 8. They are evaluated at a later time, those images or measurement results that were acquired when layer 1 was in a position outside the focus of microscope 2 being automatically discarded. This method eliminates the need for manual evaluation of the series of images or measured values.

As an alternative to storage of the signals of movement measuring means 3, the signals can also be conveyed directly to a control unit 5. In control unit 5, the signals are processed in such a way that the positional changes of layer 1 are compensated for and tissue 1 is thus always sharply focused. Control unit 5 either controls focusing device 7 of microscope 2 so that by refocusing, layer 1 remains in the focal plane of the microscope; or control unit 5 directly controls the Z drive of microscope stage 9 in accordance with the signals of movement measuring means 3. As a result of this servocontrol of layer 1, the positional changes of tissue layer 1 triggered by the animal's heartbeat and pulse movements are compensated for online. Instead of microscope stage 9, the microscope's objective can, of course, also be correspondingly servocontrolled. Because of the continuous focusing of layer 1, the images or measurement series that are acquired are entirely usable, and need not be subsequently discarded.

Control device 5 can also be embodied in such a way that the signal of movement measuring means 3 that indicates the beginning of a heartbeat is time-delayed. After the time delay, control unit 5 generates a trigger pulse that triggers the image acquisitions or measurements on tissue layer 1. The trigger signal thus takes effect with a time delay with respect to the beginning of the pulse and, with an appropriately adjusted time delay, compensates for the fact that the heartbeat precedes the beginning of the positional change of layer 1. With this feature, unsharp images are not acquired at all in conventional microscopes.

The trigger signal can additionally be used to ensure that light is available for illumination of layer 1 only when images are in fact being acquired, in order to minimize cell damage due to light (photodamage). The image acquisition process is triggered only when data are required at specific focus positions.

When a confocal microscope is used, in which unsharp images do not occur because of the confocal principle, the images of tissue layer 1 are once again intended in this example to be acquired only for a specific focus position. All other focus positions are undesired. Using the trigger signal, the specific focus position is always selected, and images of layer 1 are acquired only in that focus position. As a result, changes over time in layer 1 in that focus position can be observed irrespective of the positional change of layer 1.

In addition, alternative movement measuring means 3 can also be camera 6 or a separate camera (not depicted in FIG. 1), with which, by appropriate image processing of continuously acquired images, the focus position of tissue layer 1 is ascertained and correspondingly corrected. The position of tissue layer 1 can also be ascertained directly or indirectly using other optical measuring methods, such as a laser scanner, by scanning one of the animal's arteries. As a result, sharp and unsharp images are selected (in the case of a conventional microscope), or camera 6 is triggered appropriately (especially in the case of confocal microscopes).

An alternative possibility for sensing the positional change of tissue layer 1 consists in deliberate stimulation of the animal, e.g. by means of a cardiac pacemaker. The electrical output signals of the cardiac pacemaker can be adjusted, in terms of their cycle frequency and amplitude, for suitable stimulation and thus movement of the heart. The movement of the heart and the pulse are thus known in advance, and so also is the transmission of the movement to the position of tissue layer 1. Given a positional change of layer 1 that is defined in this fashion, appropriate refocusing or appropriate triggering for the acquisition of images can be accomplished.

The invention is suitable in particular for use in a confocal microscope, with which many tissue layers 1, especially including those located deep in the tissue, can be observed and measured with high resolution. Nonlinear effects, such as multi-photon excitation in the case of fluorescence, are advantageously utilized in this context. Infrared microscopy with infrared illumination and detection is also suitable for imaging and measurement of deeper tissue layers.

A piezoelectric focusing device can be used, in particular, for the purpose of rapid and precise refocusing. It is additionally advantageous in this context if the piezoelectric focusing device is integrated into the objective of microscope 2 or into the optics of the detector system. The distance between the objective and the specimen remains constant in this context. This prevents inadvertent contact between objective and specimen, which would otherwise be possible when focusing by means of a Z displacement (in the direction of the objective) of the microscope stage. In addition, the inertia upon displacement of the mechanical components for focusing is much less as compared to focusing with the microscope stage, and additional movements of the specimen (layer 1) as a result of focusing are avoided.

Alternatively, a so-called focusing nosepiece, comprising an objective nosepiece partially fitted with objectives, can be used for rapid and precise refocusing, so that sufficient working space above the specimen (e.g. for the attachment of electrodes, etc.) is available.

Optical or mechanical positioning elements can be used in the detector system in order to compensate for lateral movements of tissue layer 1. In a scanning microscope, the scanner itself that is present can be used (offset), or additional optical positioning elements for tilting the scanning beam are introduced, and preferably are arranged in planes conjugated with the entrance pupil of the scanning microscope.

The invention claimed is:

1. A method for investigating at least one tissue layer using a microscope, the method comprising the following steps:

focusing the microscope onto the tissue layer being investigated, wherein the tissue layer is in a living animal;

sensing positional changes of the tissue layer caused by movements of the animal or by movements of the animal's organ, or sensing at least a beginning of the positional changes;

generating signals with an electronic system that correspond to the positional changes of the tissue layer;

acquiring images or/and performing optical measurements corresponding to the positional changes even during the positional changes of the tissue layer, and storing the signals together with the images or/and the results of the optical measurements for later evaluation, in which later evaluation the images or the results of optical measurements made when the tissue layer being investigated is in focus are identified on the basis of the signals, or processing the signals in such a way that the positional changes are compensated for in real time and the tissue layer being investigated is thereby in focus.

2. The method as defined in claim 1, wherein the signals corresponding to the positional changes of the tissue layer are generated by optical scanning of the tissue layer or of other parts of the animal triggering the movement of the tissue layer.

3. The method as defined in claim 2, wherein the optical scanning is performed by scanning with a laser and by acquisition of images and corresponding image processing.

4. The method as defined in claim 1, wherein the signals corresponding to the positional changes of the tissue layer are generated by the animal's heartbeat.

5. The method as defined in claim 4, wherein the heartbeat is measured by means of electrodes or by way of the animal's pulse.

6. The method as defined in claim 1, wherein the positional changes of the tissue layer are measured in advance for calibration.

7. The method as defined in claim 1, wherein the compensation for the positional changes is accomplished in real time by way of a focusing device.

8. An apparatus for investigating at least one tissue layer comprising:
   a microscope,
   a focusing device for focusing the microscope onto the tissue layer of a living animal;
   a movement measuring means for direct or indirect sensing of positional changes caused by movements of the animal or by movements of the animal's organ, or sensing at least of the beginning of the positional changes of the tissue layer, the movement measuring means comprising an electronic system generating corresponding to the positional changes of the tissue layer;
   a camera for acquiring images and a measuring device for performing optical measurements even during the positional changes of the tissue layer, and
   a memory for storing the signals corresponding to the positional changes together with the images of the camera or together with results of the measurements of the measuring device for later evaluation.

9. The apparatus as defined in claim 8, wherein a control unit provided for processing the signals in such a way that the positional changes of the tissue layer are compensated for in real time.

10. The apparatus as defined in claim 8, wherein the movement measuring means senses the positional changes by optical measurement, image acquisition, mechanical measurement, or electrical measurement at electrodes on the animal.

* * * * *